(12) United States Patent
Falk et al.

(10) Patent No.: US 8,611,543 B2
(45) Date of Patent: Dec. 17, 2013

(54) METHOD AND SYSTEM FOR PROVIDING A MOBILE IP KEY

(75) Inventors: Rainer Falk, Erding (DE); Dirk Kröselberg, München (DE)

(73) Assignee: Siemens Aktiengesellschaft, Munich (DE)

( * ) Notice: Subject to any disclaimer, the term of this patent is extended or adjusted under 35 U.S.C. 154(b) by 573 days.

(21) Appl. No.: 12/303,092

(22) PCT Filed: May 24, 2007

(86) PCT No.: PCT/EP2007/055045
§ 371 (c)(1),
(2), (4) Date: Dec. 1, 2008

(87) PCT Pub. No.: WO2007/137987
PCT Pub. Date: Dec. 6, 2007

(65) Prior Publication Data
US 2009/0185691 A1    Jul. 23, 2009

(30) Foreign Application Priority Data

Jun. 1, 2006 (DE) .......... 10 2006 025 690
Jun. 8, 2006 (DE) .......... 10 2006 026 737
Jul. 10, 2006 (DE) .......... 10 2006 031 870

(51) Int. Cl.
*H04L 9/08* (2006.01)

(52) U.S. Cl.
USPC .......... 380/279; 713/155

(58) Field of Classification Search
None
See application file for complete search history.

(56) References Cited

U.S. PATENT DOCUMENTS

| | | | | |
|---|---|---|---|---|
| 7,502,331 | B2* | 3/2009 | Dommety et al. | 370/254 |
| 7,626,963 | B2* | 12/2009 | Patel et al. | 370/331 |
| 7,881,262 | B2* | 2/2011 | Shousterman | 370/331 |
| 2004/0013116 | A1* | 1/2004 | Greis et al. | 370/392 |
| 2005/0207379 | A1 | 9/2005 | Shen et al. | |
| 2006/0251257 | A1* | 11/2006 | Haverinen et al. | 380/270 |

FOREIGN PATENT DOCUMENTS

| | | |
|---|---|---|
| EP | 1 657 877 | 5/2006 |
| JP | 2004-312517 | 11/2004 |
| WO | 2005/086462 | 9/2005 |

OTHER PUBLICATIONS

M. Nakhjiri et al (EAP based Proxy Mobile Ip key bootstrapping for WiMAX Jan. 2005.*
WiMAX Forum Network Architecture, Stage 3: Detailed Protocols and Procedures, Release 1, Version 1.2, Jan. 11, 2008.*
S. Glass et al. "Mobile IP Authentication, Authorization, and Accounting Requirements" Network Working Group, RFC: 2977, Oct. 2000.
C. Perkins "IP Mobility Support for IPv4" Network Working Group, RFC: 3344, Aug. 2002.
D. Johnson et al. "Mobility Support in IPv6" Network Working Group, RFC: 3775, Jun. 2004.
F. Johansson et al. "Mobile IPv4 Extension for Carrying Network Access Identifiers" Network Working Group, RFC: 3846, Jun. 2004.

(Continued)

*Primary Examiner* — Fikremariam A Yalew
(74) *Attorney, Agent, or Firm* — Staas & Halsey LLP

(57) ABSTRACT

A method for providing an IP key, for encoding messages between a user terminal MS or a PMIP client and a home agent HA, wherein an authentication server only provides the mobile IP key when the authentication server recognizes, by a correspondingly encoded parameter, that the user terminal MS itself is not using mobile IP (PMIP).

22 Claims, 11 Drawing Sheets

(56) References Cited

OTHER PUBLICATIONS

C. Perkins et al. "Authentication, Authorization, and Accounting (AAA) Registration Keys for Mobile IPv4" Network Working Group, RFC: 3957, Mar. 2005.
J. Arkko et al. "Using IPsec to Protect Mobile IPv6 Signaling Between Mobile Nodes and Home Agents" Network Working Group, RFC: 3776, Jun. 2004.
A. Patel et al. "Authentication Protocol for Mobile IPv6" Network Working Group, RFC: 4285, Jan. 2006.
WiMAX End-to-End Network Systems Architecture, Stage 2: Architecture Tenets, Reference Model and Reference Points, Apr. 24, 2006.
WiMAX End-to-End Network Systems Architecture, Stage 3: Detailed Protocols and Procedures, Apr. 24, 2006.
C. Perkins, "IP Mobility Support" Network Working Group, RFC: 2002, Oct. 1996.
3GPP2, Version 2.0 "cdma2000 Wireless IP Network Standard: Simple IP and Mobile IP Services" Jul. 2005.
Cisco Aironet 1200 Series Access Point Software Configuration Guide for VxWorks "Confinguring Proxy Mobile IP".
R. Falk et al. WiMAX Security Architecture.
IEEE Std 802.16-2001, "Part 16: Air Interface for Fixed Broadband Wireless Access Systems" Apr. 8, 2002.
M. Nakhjiri et al. "EAP based Proxy Mobile IP key bootstrapping for WiMAX" Jan. 2005.
WiMAX Forum Network Architecture, Stage 2: Architecture Tenets, Reference Model and Reference Points, Release 1.0.0., Mar. 28, 2007.
M. Nakhjiri, et al. "EAP based Proxy Mobile IP key bootstrapping: A WiMAX applicability example", Feb. 2006.
Office Action issued by the Japanese Patent Office on Jul. 6, 2011 in a related Japanese patent application.

\* cited by examiner

FIG 1
Prior art

Mobility Binding Table

| Home Address | Care-of-Address | Lifetime (ms) |
|---|---|---|
| 131.192.180.42 | 129.142.23.42 | 100 |
| 213.123.24.140 | 172.23.142.49 | 150 |
| ... | ... | ... |

FIG 2
Prior art

Visitor List

| Home Address | Home Agent Address | Media Address | Lifetime |
|---|---|---|---|
| 131.192.180.42 | 129.142.23.42 | 08-00-46-26-75-6A | 100 |
| 213.123.24.140 | 172.23.142.49 | 00-02-B3-77-43-00 | 150 |
| ... | ... | ... | ... |

FIG 8

| Encoding variant | PMIP | | CMIP | |
|---|---|---|---|---|
| | NAI$_A$ | NAI$_R$ | NAI$_A$ | NAI$_R$ |
| V1 | P | P | C | C |
| V2 | / | / | C | C |
| V3 | P | P | / | / |
| V4 | / | P | / | C |
| V5 | / | / | / | C |
| V6 | / | P | / | / |

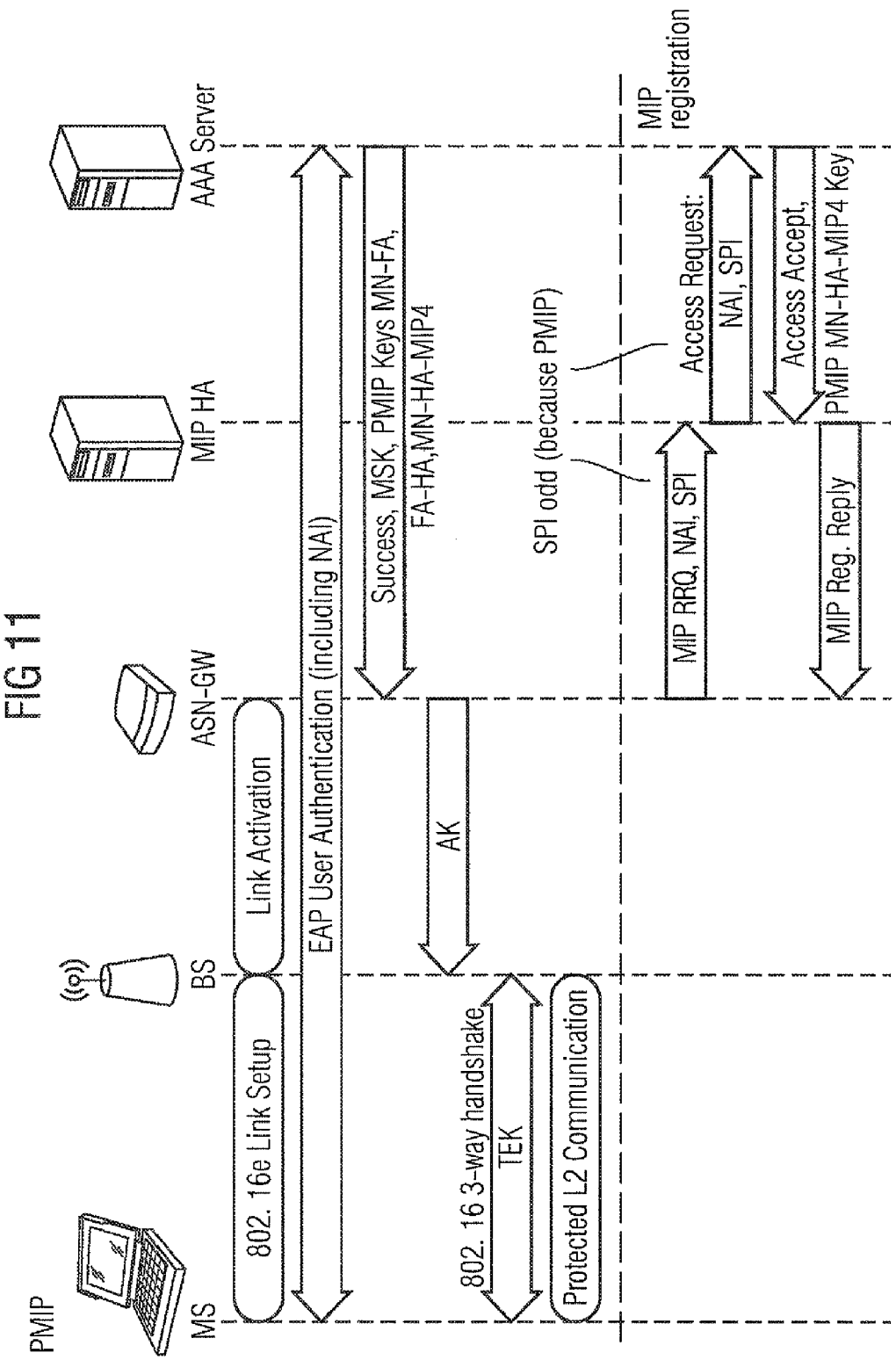

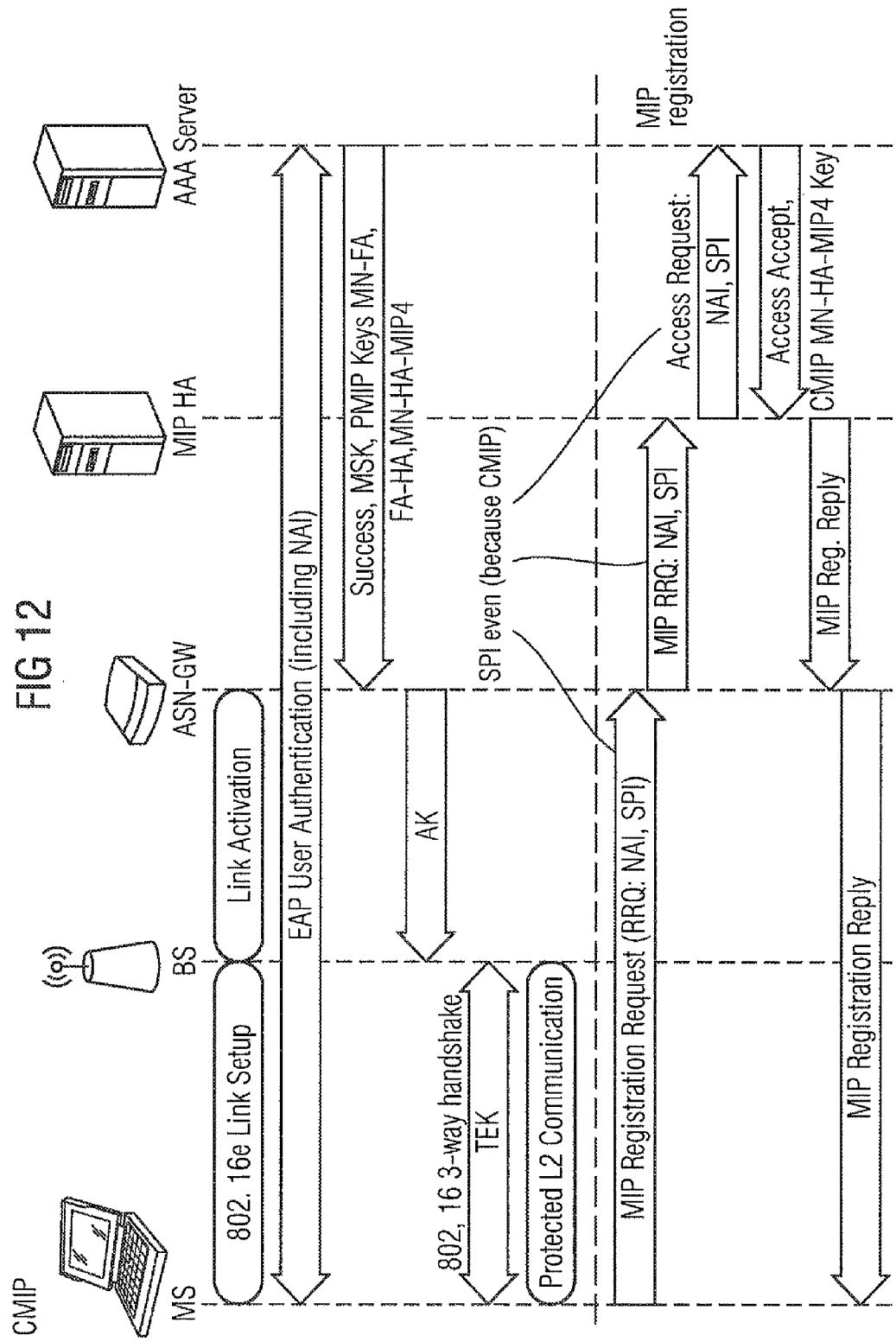

METHOD AND SYSTEM FOR PROVIDING A MOBILE IP KEY

CROSS REFERENCE TO RELATED APPLICATIONS

This application is based on and hereby claims priority to German Application Nos. 10 2006 025 690.5 filed on Jun. 1, 2006, 10 2006 026 737.0 filed on Jun. 8, 2006 and 10 2006 031 870.6 filed on Jul. 10, 2006, and International PCT Application No. PCT/EP2007/055045, filed on May 24, 2007, the contents of which are hereby incorporated by reference.

BACKGROUND OF THE INVENTION

The invention relates to a method and system for providing a Mobile IP key, in particular for WiMax networks.

The internet with the TCP/IP protocol offers a platform for the development of higher-level protocols for the mobile domain. Because the internet protocols are widely established, a large user community can be opened up by corresponding protocol extensions for mobile environments. However, the traditional internet protocols were originally not designed for mobile applications. In the packet-switching operation of the traditional internet the packets are exchanged between stationary computers which neither change their network address nor roam between different subnetworks. In radio networks including mobile terminals or computers, mobile computers MS (Mobile Station) are frequently integrated into different networks. With the aid of a corresponding server the DHCP (Dynamic Host Configuration Protocol) enables an IP address and further configuration parameters to be assigned dynamically to a computer in a network. A computer that is integrated into a network is automatically assigned a free IP address by the DHCP protocol. A mobile computer with DHCP installed only needs to come into range of a local area network that supports configuration via the DHCP protocol. With the DHCP protocol, dynamic address assignment is possible, i.e. a free IP address is automatically allocated for a specific period of time. After this period of time has elapsed, either the request must be repeated by the mobile computer MS or the IP address can be assigned elsewhere.

With DHCP, a mobile computer MS can be integrated into a network without manual configuration. The only prerequisite is that a DHCP server is available. A mobile computer MS can thus use services of the local area network and for example use centrally stored files. If, on the other hand, a mobile computer MS itself provides services, a potential service user cannot locate the mobile computer MS because its IP address changes in each network in which the mobile computer is integrated. The same happens if an IP address changes during an existing TCP connection. This leads to the connection being aborted. With Mobile IP, a mobile computer MS is for that reason assigned an IP address which it also retains in a different network. With a traditional IP network change it is necessary to adjust the IP address settings accordingly. A constant adjustment of IP configuration mechanisms and the traditional automatic configuration mechanisms will interrupt the existing connection in the event of a change in the IP address. The MIP protocol (RFC2002, RFC2977, RFC3344, RFC3846, RFC3957, RFC3775, RFC3776, RFC4285) supports the mobility of mobile terminals MS. With the traditional IP protocols, the mobile terminal MS must adjust its IP address every time it changes the IP subnetwork in order to ensure that the data packets addressed to the mobile terminal MS are correctly routed. In order to maintain an existing TCP connection, the mobile terminal MS must retain its IP address, since a change of address leads to an interruption of the connection. The MIP protocol allows a transparent connection between the two addresses, which is to say a permanent home address and a second, temporary, care-of address. The care-of address is the IP address under which the mobile terminal MS can be reached at the present time.

A home agent HA is a representative of the mobile terminal MS while the mobile terminal MS is not resident in the original home network. The home agent is kept constantly informed about the current whereabouts of the mobile computer MS. The home agent HA usually constitutes a component of a router in the home network of the mobile terminal. When the mobile terminal MS is located outside of the home network, the home agent HA provides a function that enables the mobile terminal MS to log in. The home agent HA then forwards the data packets addressed to the mobile terminal MS into the current subnetwork of the mobile terminal MS.

A foreign agent FA is located in the subnetwork in which the mobile terminal MS is on the move. The foreign agent FA forwards incoming data packets to the mobile terminal MS or, as the case may be, to the mobile computer MS. The foreign agent FA is located in a foreign network which is referred to as a visited network. The foreign agent FA likewise usually constitutes a component of a router. The foreign agent FA routes all the administrative mobile data packets between the mobile terminal MS and its home agent HA. The foreign agent FA unpacks the tunneled IP data packets sent by the home agent HA and forwards their data to the mobile terminal MS.

The home address of the mobile terminal MS is a permanent address at which the mobile terminal MS can be reached at all times. The home address has the same address prefix as the home agent HA. The care-of address is the IP address which the mobile terminal MS uses in the visited network.

The home agent HA maintains what is called a Mobility Binding Table (MBT). The entries in said table serve to associate the two addresses, i.e. the home address and the care-of address, of a mobile terminal MS with each other and to redirect the data packets accordingly.

The MBT table contains entries relating to the home address, the care-of address and a value specifying the period of time during which this assignment is valid (lifetime).

FIG. 1 shows an example of a mobility binding table MBT according to the related art.

The foreign agent FA includes a visitor list (VL) containing information about the mobile terminals MS that currently reside in the IP network of the foreign agent FA.

FIG. 2 shows an example of a visitor list of said kind according to the related art.

In order for a mobile computer MS to be able to be integrated into a network it must first discover whether it is located in its home network or in a visited network. In addition the mobile terminal MS must find out which computer is in the subnetwork of the home or foreign agent. This information is determined by what is termed agent discovery.

By the subsequent registration the mobile terminal MS can communicate its current location to its home agent HA. For that purpose the mobile computer or mobile terminal MS sends the current care-of address to the home agent. In order to register, the mobile computer MS sends a registration request to the home agent. The home agent HA enters the care-of address in its list and responds with a registration reply. Therein lies a security problem, however. Since in principle any computer can send a registration request to a home agent HA, a home agent HA could easily be deceived into believing a computer had moved into a different network.

In this way a foreign computer could intercept all the data packets of a mobile computer or mobile terminal MS without a sender learning about it. In order to prevent this, the mobile computer MS and the home agent HA have a shared secret key. When a mobile computer MS returns to its home network, it deregisters from the home agent HA, since the mobile computer MS can now receive all the data packets itself. A mobile radio network must have a plurality of security characteristics, including the following: Information may only be made accessible to desired communication partners, i.e. undesirable eavesdroppers must not obtain any access to transmitted data. The mobile radio network must therefore have the characteristic of confidentiality. In addition authenticity must be established. Authenticity allows a communication partner to determine beyond doubt whether a communication has actually been set up to a desired communication partner or whether a foreign party is masquerading as a communication partner. Authentications can be performed per message or per connection. If authentication is performed on the basis of connections, the communication partner is identified only once at the start of a session. For the remainder of the session it is then assumed that subsequent messages continue to originate from the corresponding sender. Even when the identity of a communication partner is established, i.e. the communication partner has been authenticated, the situation can occur that said communication partner is not allowed to access all resources or is not allowed to use all services via the network. In this case a corresponding authorization is conditional on a related authentication of the communication partner.

In mobile data networks messages have to travel relatively long distances over air interfaces and consequently are easily accessible to potential attackers. Security aspects therefore play a special role in mobile and wireless data networks. Encryption techniques represent a significant way to increase security in data networks. As a result of the encryption it is possible to transmit data over insecure communication paths, over air interfaces for example, without unauthorized third parties gaining access to the data. For encryption purposes the data, i.e. what is referred to as plaintext, is transformed with the aid of an encryption algorithm into cipher text. The encrypted text can be transported over the insecure data transmission channel and subsequently decrypted or deciphered.

As a promising wireless access technology, WiMax (Worldwide Interoperability for Microwave Access) is being proposed as a new standard that uses IEEE 802.16 for the wireless transmission. The aim with WiMax is to provide coverage over a range of up to 50 km at data rates of over 100 Mbits per second by transmitter stations.

FIG. 3 shows a reference model for a WiMax radio network. A mobile terminal MS is located in the area of an access serving network (ASN). The access serving network ASN is connected to a home network HCSN (Home Connectivity Service Network) via at least one visited network (Visited Connectivity Service Network VCSN) or intermediate network. The different networks are connected to one another via interfaces or reference points R. The home agent HA of the mobile station MS is located in the home network (HCSN) or in one of the visited networks (VCSN).

WiMax supports two implementation variants of Mobile IP, namely what is termed a Client MIP (CMIP), in which the mobile station MS itself implements the MIP client function, and a Proxy MIP (PMIP), in which the MIP client function is implemented by the WiMax access serving network ASN. The functionality provided for that purpose in the ASN is referred to as a Proxy Mobile Node (PMN) or as a PMIP client. This enables MIP to be used also with mobile stations MS which themselves do not support MIP.

FIG. 4 shows the connection setup for Proxy MIP (PMIP) when the home agent HA is located in the visited network VCSN, according to the related art.

Following setup of a wireless connection between the mobile terminal MS and a base station BS, an access authentication is performed first. The authentication, authorization and accounting (AAA) function is performed by what are termed AAA servers. Authentication messages are exchanged between the mobile terminal MS and the AAA server of the home network (HAAA); the address of the home agent HA and an authentication key are obtained by said messages. The authentication server in the home network contains the profile data of the subscriber. The AAA server receives an authentication request message containing a subscriber identity of the mobile terminal. Following successful access authentication the AAA server generates an MSK key (MSK: Master Session Key) in order to protect the data transmission link between the mobile terminal MS and the base station BS of the access serving network ASN. Said MSK key is transmitted by the AAA server of the home network via the intermediate network CSN to the access serving network ASN.

Following the access authentication, the DHCP proxy server is configured in the access serving network ASN, as can be seen in FIG. 4. If the IP address and host configuration are already contained in the AAA reply message, all of the information is downloaded into the DHCP proxy server.

Following successful authentication and authorization the mobile station or mobile terminal MS sends a DHCP discovery message and an IP address is assigned.

When a mobile terminal MS is integrated into a network, the mobile terminal MS must possibly be able to ascertain whether it is located in a home or a visited network. The mobile terminal MS must also find out which computer is the home or, as the case may be, foreign agent in the respective network. This information is determined by what is termed agent discovery. There are two types of agent discovery, namely what is termed agent advertisement and agent solicitation.

With agent advertisement, the agents, i.e. the home or foreign agents, periodically send broadcast messages to all computers or mobile terminals of the subnetwork. Any computer that intercepts the broadcast messages in a specific period of time can thus identify the agents in the respective subnetwork.

When a mobile terminal MS is reactivated it is generally not practical to wait for the next agent advertisement. The mobile terminal MS has to know immediately in which subnetwork it is currently located. With so-called agent solicitation, the mobile terminal MS therefore sends a request to all computers of the respective subnetwork to perform an agent advertisement. By agent solicitation the mobile terminal MS can force the agents to identify themselves immediately, thereby considerably shortening the waiting time. Agent solicitation is also performed if an agent advertisement fails to materialize, for example in the case of packet loss or network change. With the aid of agent discovery a mobile terminal MS can also ascertain whether it is located in its home network or in a visited network. The mobile terminal MS recognizes its home agent HA on the basis of the packet information contained within an agent advertisement message. If the mobile terminal MS receives message packets from a visited network, it can additionally establish whether its location has changed since the last advertisement. If the mobile terminal MS receives no advertisement message, it initially assumes that it is located in the home network and that the home agent HA has a problem. The mobile terminal MS then attempts to contact the router of the network in order to confirm this assumption. If the mobile terminal MS is not located in its home network, it thereupon tries to reach a DHCP server and obtain an address of the subnetwork. If this is successful, the mobile terminal MS uses this address as what is called a colocated care-of address and makes contact with the home agent HA. The colocated care-of address is an address that is assigned to the mobile terminal MS in the visited network and also transmitted to the home agent HA.

A distinction is drawn between network-based mobility management (PMIP) and terminal-based mobility management (CMIP). With terminal-based mobility management CMIP, the terminal supports Mobile IP (MIP).

FIG. 4 shows the connection setup in the case of traditional network-based mobility management (PMIP), while FIG. 5 represents the connection setup in the case of traditional terminal-based mobility management (CMIP).

During the setting up of a connection between the mobile terminal MS and the network, the authentication server of the home network (H-AAA) sends an authentication acknowledgement message (SUCCESS) following successful authentication of the subscriber. The authentication acknowledgement message reports to the authentication client that the authentication of the subscriber has been successfully completed.

With Proxy MIP or network-based mobility management (PMIP), the mobile terminal does not support Mobile IP or the corresponding MIP software is not activated in the mobile terminal MS.

In contrast, with Client MIP (CMIP) or terminal-based mobility management, Mobile IP is supported by the respective terminal or mobile station MS.

In the case of Proxy MIP the mobile terminal MS only recognizes an IP address assigned by the DHCP server. The care-of address of the mobile terminal MS is not known to the mobile terminal, but is known to the PMIP client the foreign agent FA and the home agent HA. In contrast, in the case of Client MIP, the mobile terminal MS recognizes both of its IP addresses, i.e. both the home address and the care-of address.

As can be seen in FIGS. 4, 5, an MIP registration takes place following the IP address assignment. With the MIP registration, the home agent HA is informed about the current location of the mobile terminal MS. For its registration the mobile terminal MS or the corresponding PMIP client sends a registration request containing the current care-of address to a home agent HA. The home agent HA enters the care-of address in a list administered by it and responds with a registration reply. Since in principle any computer can send a registration request to a home agent HA, a home agent HA could easily be deceived into believing a computer or a mobile terminal MS had moved into a different network. In order to prevent this, both the mobile terminal MS and the home agent HA have a shared secret key, i.e. what is referred to as a Mobile IP key (MIP-KEY).

In the case of Proxy MIP (PMIP) the registration request (MIPRRQ) is transmitted via a foreign agent FA to the home agent HA by a PMIP client within the access serving network ASN. The home agent HA has a key for the subscriber assigned by the associated authentication server H-AAA and transmits said key with the MIP registration reply (MIP Registration Reply), as shown in FIG. 4.

In terminal-based mobility management (CMIP) the registration request message (MIPRRQ) is routed directly from the mobile terminal MS via the foreign agent FA to the home agent HA, as shown in FIG. 5.

As can be seen from FIGS. 4, 5, the same Mobile IP key (MIP Key) is thus provided in the case of PMIP and CMIP during the access authentication by the authentication server for the purpose of encrypting Mobile IP signaling messages. The Mobile IP key serves for encrypting Mobile IP signaling messages between the Mobile IP client and the Mobile IP home agent HA.

For the CMIP case shown in FIG. 5, the authenticator therefore receives a Mobile IP key that it does not need at all. The authenticator is typically located in a gateway node of the access serving network ASN. Since the Mobile IP key is intended to encrypt signaling messages between the mobile terminal MS and the home agent HA, the authenticator does not need this Mobile IP key. Thus, in the traditional system, the access serving network ASN receives a key for which it has no need whatsoever, but which can nonetheless be used for manipulation purposes. For example, an unauthorized Mobile IP registration request message (MIPRRQ) could be sent by the gateway node of the access serving network ASN with the aid of the unnecessarily transmitted Mobile IP key. A further disadvantage is that the unnecessarily transmitted Mobile IP key needlessly occupies storage space in the ASN gateway node.

SUMMARY

It is therefore one potential object to provide a method and a system in which, in order to avoid manipulations, a Mobile IP key is distributed only to the nodes that actually need it.

The inventors propose a method for providing a Mobile IP key which is provided for encrypting messages between a subscriber terminal (MS) or a PMIP client and a home agent (HA), wherein an authentication server only provides the Mobile IP key (MIP-KEY) if the authentication server recognizes on the basis of a correspondingly encoded parameter P that the subscriber terminal (MS) itself does not use Mobile IP (PMIP).

In a preferred embodiment of the method the encoded parameter P is formed by an encoded subscriber identity NAI (Network Access Identifier).

In a preferred embodiment the authentication server is formed by an AAA authentication server.

In a further embodiment of the method, the encoded subscriber identity is transmitted to the authentication server in a message during an authentication of the subscriber terminal MS.

In an alternative embodiment of the method, the encoded subscriber identity NAI is transmitted to the authentication server in a message during a registration of the subscriber terminal MS.

In an alternative embodiment of the method, the encoded parameter is therein formed by an encoded security parameter index (SPI).

In a preferred embodiment the encoded security parameter index (SPI) is therein transmitted to the authentication server during a registration of the subscriber terminal MS.

In an embodiment of the method, the parameter P is encoded by the mobile terminal MS.

In an alternative embodiment of the method, the parameter P is encoded by an authenticator.

In a further alternative embodiment of the method the parameter P is encoded by a PMIP client.

In a further alternative embodiment of the method the parameter P is encoded by a foreign agent FA.

In a preferred embodiment of the method, information indicating the MIP version concerned is additionally encoded in the parameter P.

In a further embodiment of the method, the home agent HA requests the Mobile IP key (MIP-KEY) from the authentication server, specifying the encoded parameter in the process.

In a further embodiment of the method, the authentication server provides two different MIP keys, the home agent HA being provided with a first CMIP key by the authentication server if the mobile terminal MS itself uses Mobile IP, and the home agent HA being provided with a second PMIP key by the authentication server if the mobile terminal MS itself does not use Mobile IP.

In a preferred embodiment of the proposed method, the authentication server calculates a hash value H on the basis of a Mobile IP root key (RK) and a character string, said hash value H being provided as a Mobile IP key (MIP-KEY).

In this case the character string is preferably formed from concatenated character substrings.

In a preferred embodiment a character substring is formed by an IP address of the home agent HA.

In an embodiment of the method, the subscriber identity NAI has the following data format: [Routing Realm1! Routing Realm2! . . . !] {Auth Mode} pseudo Identity @realm, where the pseudo identity is a random number generated by the terminal MS during the authentication and where Auth Mode is a character which specifies an authentication mode.

In an embodiment of the method, the authentication mode (Auth Mode) in the encoded subscriber identity NAI is extended by at least one character which specifies whether the subscriber terminal MS itself uses Mobile IP.

The inventors also propose a system for providing a Mobile IP key which is provided for the purpose of encrypting messages between a subscriber terminal MS or a PMIP client and a home agent HA, wherein an authentication server only provides the Mobile IP key (MIP-KEY) if the authentication server recognizes on the basis of a correspondingly encoded parameter P that the subscriber terminal MS itself does not use Mobile IP (PMIP).

The inventors further propose a mobile terminal MS which transmits an encoded parameter P in network login messages that are addressed to an authentication server and/or in MIP registration request messages that are addressed to a home agent HA, said encoded parameter P specifying whether the mobile terminal MS itself uses Mobile IP.

A client computer of an access serving network ASN is proposed, which client computer transmits an encoded parameter P in MIP registration request messages that are addressed to a home agent HA, said encoded parameter P specifying whether the associated mobile terminal MS uses Mobile IP.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a mobility binding table according to the related art;

FIG. 2 shows a visitor list according to the related art;

FIG. 8 shows a table to explain options for encoding a subscriber identity transmitted during the network login for the purpose of explaining an embodiment of the proposed method;

FIG. 11 shows a further signal diagram for a PMIP case for the purpose of explaining an alternative embodiment of the proposed method for providing a Mobile IP key; and FIG. 12 shows a further signal diagram for a CMIP case for the purpose of explaining an alternative embodiment of the proposed method for providing a Mobile IP key.

DETAILED DESCRIPTION OF THE PREFERRED EMBODIMENT

Figure 3:
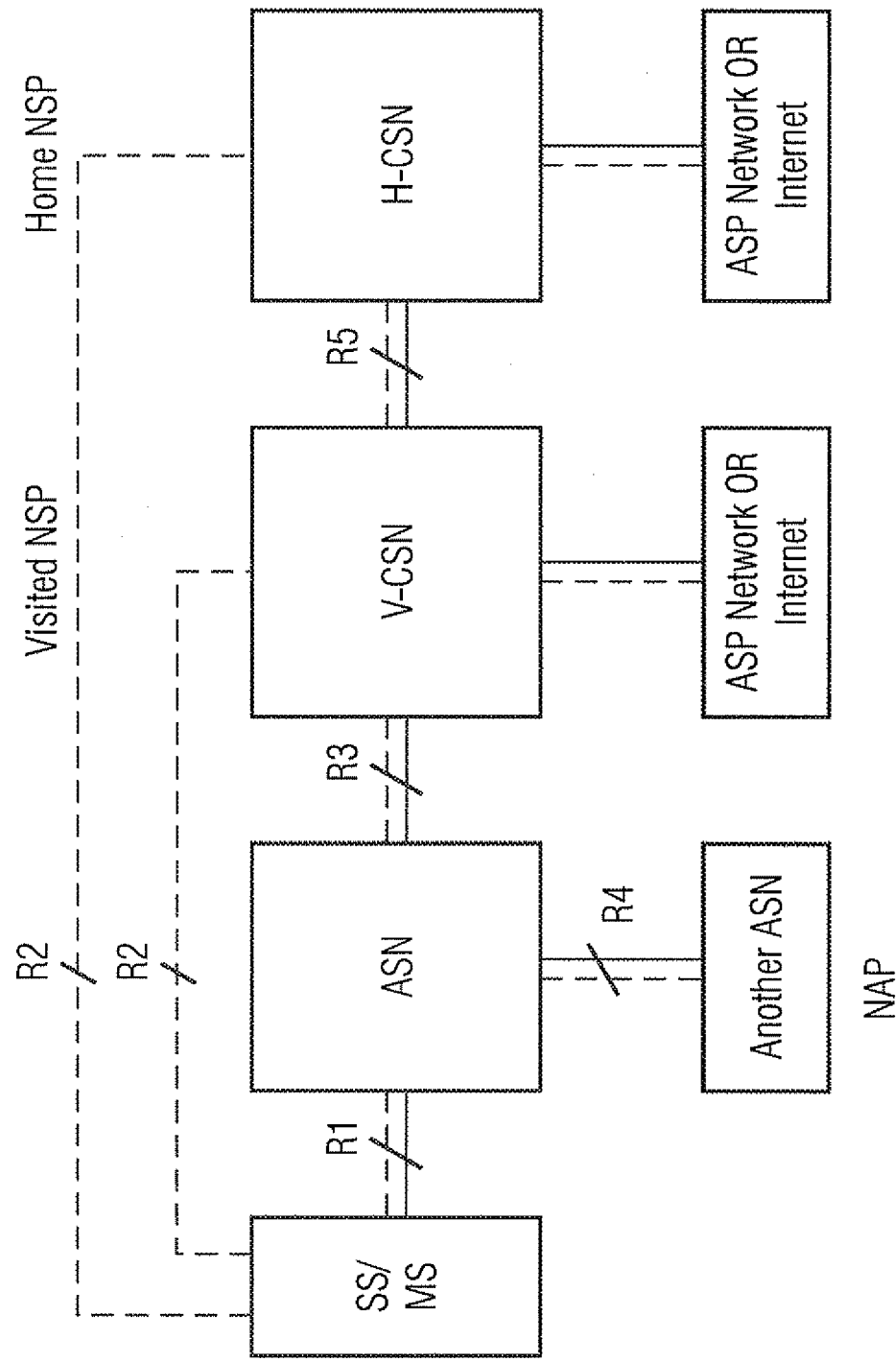
FIG. 3 shows a reference model for a WiMax radio network.
Figure 4:
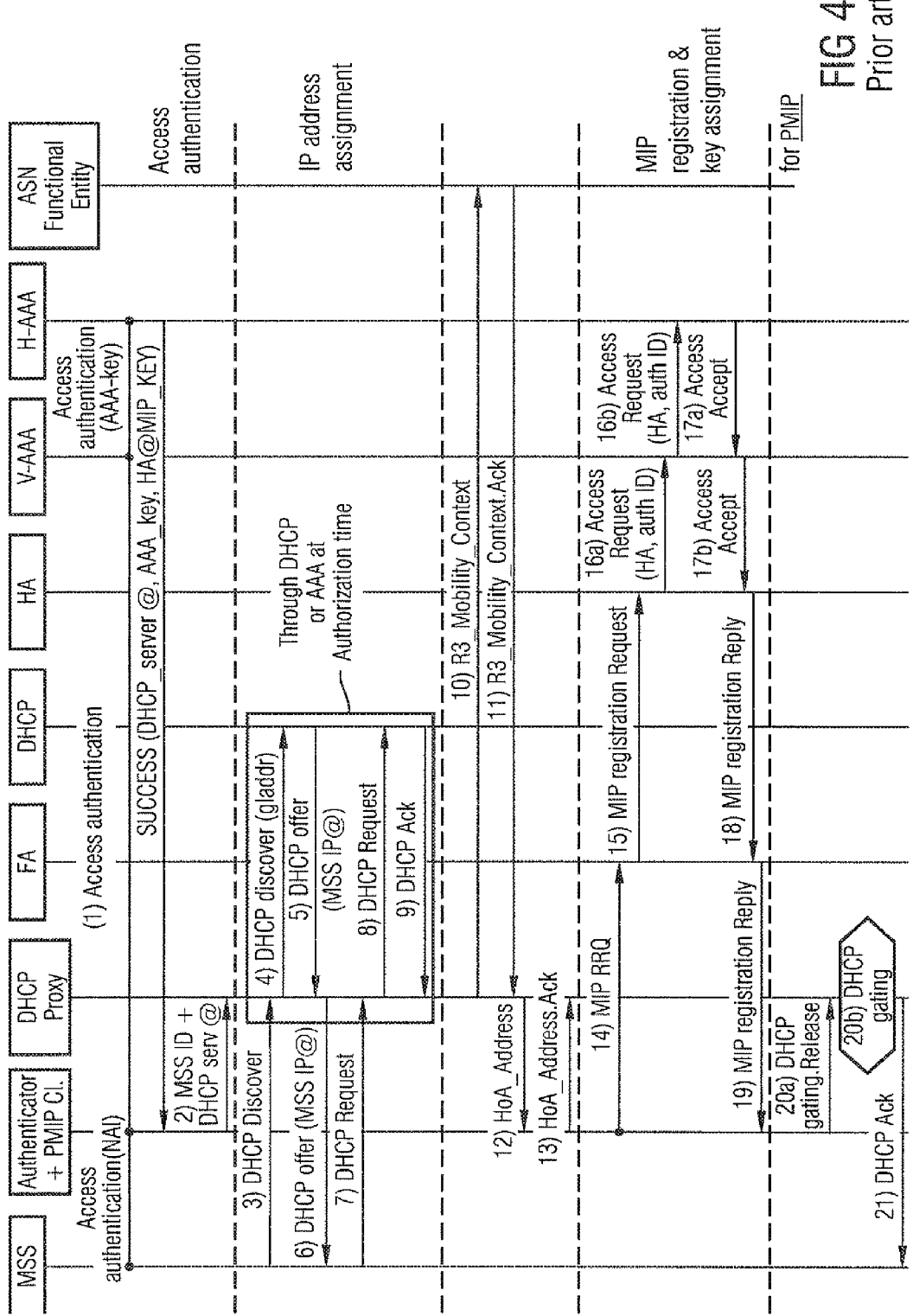
FIG. 4 shows a connection setup for Proxy MIP (PMIP) according to the related art.
Figure 5:
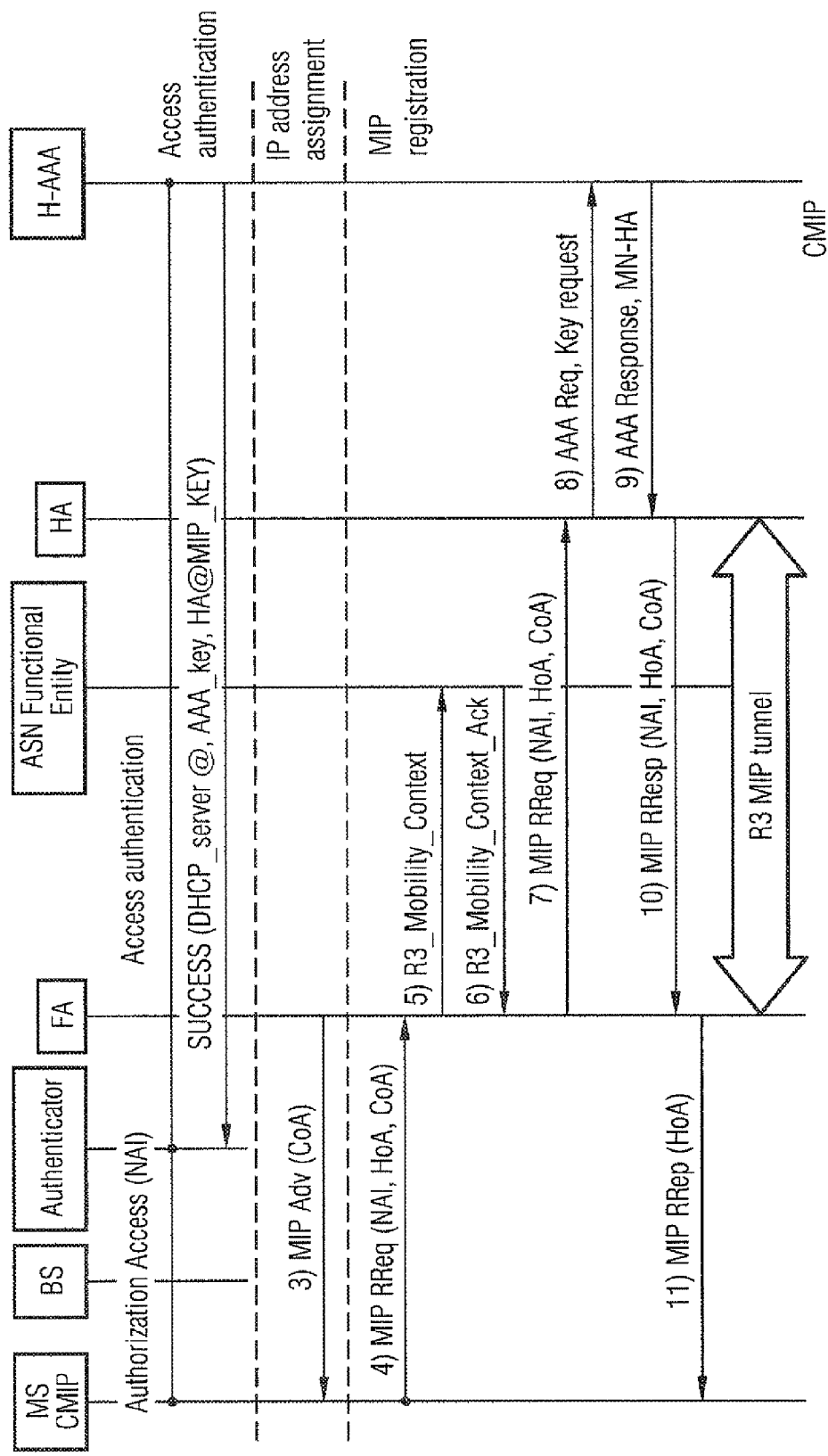
FIG. 5 shows a connection setup for Client MIP (CMIP) according to the related art.

Reference will now be made in detail to the preferred embodiments of the present invention, examples of which are illustrated in the accompanying drawings, wherein like reference numerals refer to like elements throughout.

Figure 6:
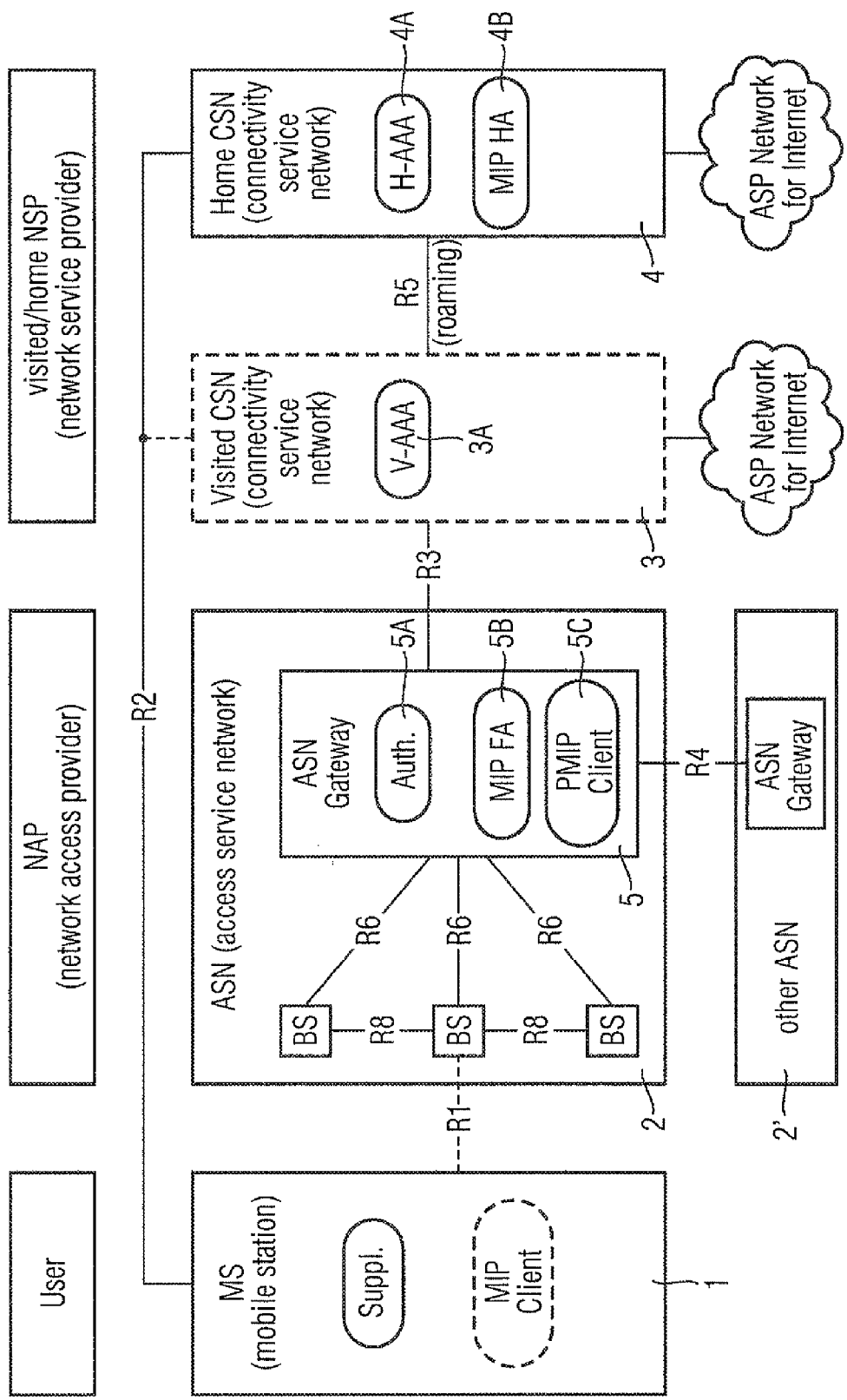
FIG. 6 shows a WiMax network in which the proposed method for providing a Mobile IP key can be used.

FIG. 6 shows a WiMax network architecture in which the proposed method for providing a Mobile IP key can be used. A mobile terminal 1 (MS=Mobile Station) is connected to an access serving network 2 (ASN=Access Service Network) via an interface R1. The access serving network 2 is connected via an interface R3 to a visited network 3 (VCSN=Visited Connectivity Service Network). Said visited network 3 is in turn connected via an interface R5 to a home network 4 (HCSN=Home Connectivity Service Network).

If the mobile terminal 1 moves from a first access serving network 2 to a second access serving network 2', a handover takes place between the first and second access serving network. Said handover is referred to in the WiMax specification as "Macro Mobility Management" or also as "R3 Mobility" or "Inter ASN Mobility". The visited network 3 and the home network 4 are in each case connected to a network of an access service provider (ASP) or to the internet.

Each access serving network 2 contains a plurality of base stations BS which are in turn connected via an interface R6 to an ASN gateway node 5. The ASN gateway node 5 shown in FIG. 6 comprises an authenticator 5A, a MIP foreign agent 5B and a PMIP client 5C. Disposed in each visited network 3 is an AAA server 3A, as shown in FIG. 6. An authentication server 4A and a home agent 4B are likewise disposed in the home network 4.

Two cases need to be distinguished with regard to the mobile terminal 1. The mobile terminal 1 itself supports Mobile IP and has its own CMIP client or the mobile terminal 1 does not support Mobile IP and requires a PMIP client 5C in the gateway node 5 of the access serving network 2.

Figure 7:
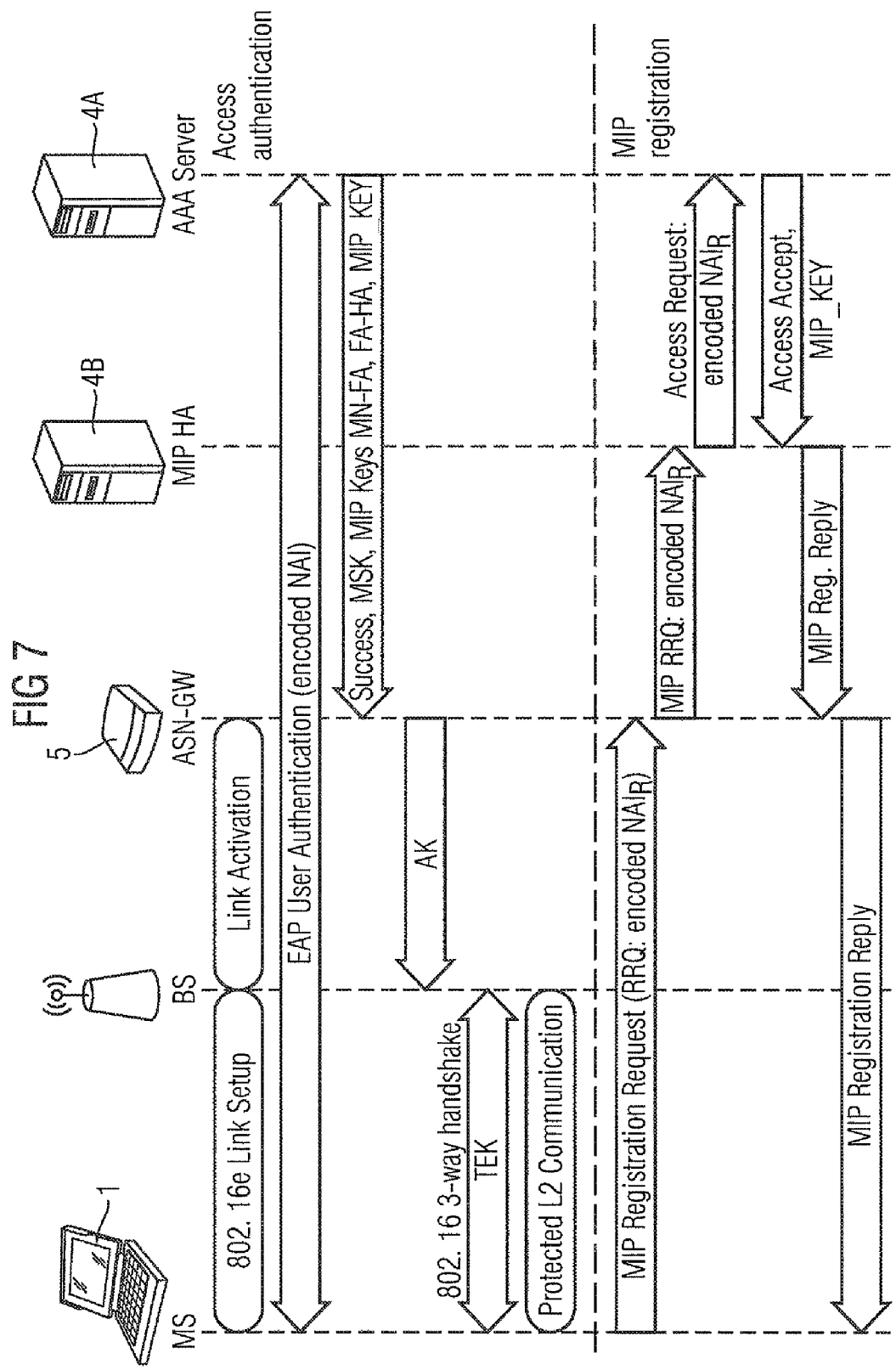
FIG. 7 shows a WiMax network login in which the proposed method for providing a Mobile IP key is performed.

FIG. 7 shows a signal diagram for the purpose of explaining the method.

In the proposed method for providing a Mobile IP key which is provided for encrypting, i.e. providing cryptographic protection e.g. against manipulation and/or interception, messages between a subscriber terminal 1 or a PMIP client 5C and a home agent 4B, the authentication server 4A only provides the Mobile IP key if the authentication server 4A in the home network 4 recognizes on the basis of a correspondingly encoded parameter P that the subscriber terminal 1 itself does not use Mobile IP or a PMIP case is present. With the aid of the Mobile IP key, in particular a manipulation (alteration) of messages can be prevented by cryptographic security methods (cryptographic checksum, Message Authentication Code). Messages can also be encrypted as protection against interception.

Said parameter P is preferably an encoded subscriber identity or a network access identifier (NAI).

However, other parameters P transmitted during the network login can also be encoded with the method. For example, a Security Parameter Index (SPI) used during the registration can also be encoded.

As can be seen from FIG. 7, the mobile terminal 1 transmits an encoded subscriber identity NAI to the authentication server 4A during its authentication. On the basis of the encoded subscriber identity NAI, the authentication server 4A recognizes whether the mobile terminal 1 itself supports Mobile IP (CMIP) or whether the mobile terminal 1 does not use Mobile IP (PMIP). Only if the authentication server 4A establishes on the basis of the encoded parameter P that the mobile subscriber terminal 1 itself does not use Mobile IP, i.e. if the PMIP case is present, will the Mobile IP key (MIP Key) be provided for the purpose of encrypting messages between a subscriber terminal 1 and a home agent 4B of the mobile terminal 1. In a first possible embodiment the authentication server 4A transmits the Mobile IP key when it is established that the subscriber terminal 1 itself does not use Mobile IP (PMIP case). For said PMIP case the authentication server 4A sends the Mobile IP key (MIP Key) in a SUCCESS message to an authenticator 5A which is contained in the ASN gateway 5 and which in turn provides the key to a PMIP client. In a first variant, for the converse case (CMIP case), i.e. when the mobile terminal 1 supports Mobile IP, no Mobile IP key is transmitted to the authenticator 5A by the authentication server 4A. In an alternative variant the authentication server 4A provides two different IP keys, namely a first CMIP key for the case where the mobile terminal 1 itself uses Mobile IP, and a second PMIP key for the case where the mobile terminal 1 itself does not use Mobile IP. The corresponding key is transmitted to the authenticator 5A and home agent 4B by the authentication server 4A.

In one embodiment the encoding of the parameter P and in particular of the subscriber identity NAI is carried out by the mobile terminal 1. In alternative embodiments the parameter P is encoded by the authenticator 5A, by a PMIP client 5C or by a foreign agent 5B.

In a preferred embodiment information indicating the MIP version concerned, i.e. MIPV4 or MIPV6, is additionally encoded into the parameter.

During the MIP registration the home agent 4B requests the Mobile IP key that is required for encrypting messages between the home agent 4B and the subscriber terminal 1 or a PMIP client 5C of the subscriber terminal 1 from the authentication server 4A, in the process specifying the encoded parameter P, in particular specifying the encoded subscriber identity NAI.

The subscriber identity NAI can be encoded in a plurality of different ways. It is not essential for the same subscriber identity NAI to be used during the authentication and during the registration. The subscriber identity $NAI_A$ used during the authentication and the subscriber identity $NAI_R$ used during the registration can therefore be different, as indicated in FIG. 7.

The subscriber identity NAI preferably has the following data format:
[Routing Realm1! Routing Realm2! . . . !]{Auth Mode} pseudo Identity @realm,
where the pseudo identity represents a random number generated by the terminal 1 during the authentication and where Auth Mode is a character which specifies an authentication mode. The authentication mode indicates to the authentication server which authentication operating mode is being requested by the mobile terminal 1.

In a possible embodiment of the method, the authentication mode contained in the subscriber identity NAI, which mode is possibly represented by a character or a digit, is extended by at least one additional character which specifies whether the subscriber terminal 1 itself uses Mobile IP or not.

For example, the subscriber identity NAI
{1}31276453@vodafone.com
is encoded as follows for the CMIP case:
{1C}31276453@vodafone.com
and encoded as follows for the PMIP case:
{1P}31276453Cvodafone.com.

Alternatively the subscriber identity NAI is, for example, only extended by one character when a CMIP case is present, with the result that the following encoded subscriber identity is produced for the CMIP case:
{IC}312764531@vodafone.com,
with no extension of the authentication mode character string being performed for the PMIP case, resulting in the following encoding for the PMIP case:
{1}31216453@vodafone.com.

Different variants for encoding the subscriber identity NAI result, whereby the subscriber identities $NAI_A$, $NAI_R$ used during the authentication and registration can be encoded identically or differently.

Possible encoding variants are shown in tabular form in FIG. 8.

In variant V1, for example, the character string in the authentication mode for the PMIP case both for the subscriber identity $NAI_A$ during the authentication and for the subscriber identity $NAI_R$ during the registration is extended by the character "P", whereas for the CMIP case they are extended by the character "C"

In variant V2, no extension of the authentication mode character string is carried out for the PMIP case, while for the CMIP case the authentication mode is extended by the character "C". Further variants V3 to V6 are given in the table according to FIG. 8.

Optionally encoded into the subscriber identity NAI in addition is information indicating which MIP version is involved, for example MIPV4 or MIPV6, a character "4" or "6", as applicable, being appended in addition to the character "P" or "C".

Any ASCII characters can of course be used for encoding the respective cases.

Depending on the MIP mode, as encoded in the subscriber identity NAI, the authentication server 4A delivers either a PMIP key or a CMIP key to the home agent 4B.

With the proposed method, the home agent 4B or the authentication server 4A recognizes on the basis of the encoded subscriber identity NAI that a mobile terminal 1 uses during the network login, whether CMIP or PMIP is being used.

The key derivation and transmission is performed as a function of whether a CMIP or PMIP case is present.

In a first variant, an MIP key is transmitted to the access serving network 5 only if a PMIP case is actually present. In this case the key hierarchy does not have to be changed and only one key is generated for encrypting messages between the mobile terminal 1 and the home agent 4B.

In an alternative embodiment, different MIP keys are derived for the PMIP and the CMIP case.

For example, the authentication server uses a hash function H to calculate a hash value on the basis of a Mobile IP root key (MIP-RK) and a character string, said hash value being provided as the Mobile IP key:

$$MM\text{-}HA\text{-}PMIP4=H(MIP\text{-}RK, \text{``}PMIP4MNHA\text{''}|HA\text{-}IP)$$

$$MN\text{-}HA\text{-}CMIP4=H(MIP\text{-}RK, \text{``}CMIP4MNHA\text{''}|HA\text{-}IP)$$

The character string used for the calculation of the hash value using the hash function H can be composed, for example, of concatenated character substrings. In this case a character substring HA-IP is preferably formed by the IP address of the home agent 4B. Said character substring is appended or, as the case may be, concatenated to a character string that is different for the PMIP case and for the CMIP case, and for example takes the form "PMIP4MNHA" for the PMIP case and "CMIP4MNHA" for the CMIP case. The hash function H is then used to calculate the hash value from the composed character string and a Mobile IP root key (MIP-RK). Since the composed character string has a part that is different for the PMIP and for the CMIP case, the two calculated hash values $H_P$ (MM-HA-PMIP4), $H_C$ (MN-HA-CMIP4) are different for the PMIP and the CMIP case and can be provided as the Mobile IP key for the respective case.

Only the PMIP key (MN-HA-PMIP4), but not the CMIP key (MN-HA-CMIP4), is sent to the access serving network 5.

If later during the MIP registration the home agent 4B requests the MIP key from the authentication server 4A, the authentication server 4A issues either the PMIP key (MS-HA-PMIP4) or the CMIP key (MS-HA-CMIP4) to the home agent 4B on the basis of the MIP mode (CMIP or PMIP) encoded in the subscriber identity NAI. Although the access serving network ASN (Proxy-MN) receives an MIP key in this case, this cannot be used if the client supports MIP (CMIP case). The home agent 4B namely accepts only signaling messages from an MIP client that are protected by the CMIP key (MN-HA-CMIP4).

Alternatively, the different keys for PMIP and CMIP can be derived directly in the home agent 4B. This can be implemented in such a way that the authentication server 4A sends the home agent 4B the key derived from the MIP root key (MIP-RK). The home agent can then itself perform the derivation of the corresponding MIP key (MN-HA) on the basis of the information as to whether the subscriber uses PMIP or CMIP.

In one embodiment, different keys are used in each case for Mobile IP version 4 and Mobile IP version 6 and provided for the PMIP case and the CMIP case. For example, the authentication server uses a hash function H to calculate a hash value on the basis of a Mobile IP root key (MIP-RK) and a character string, said hash value being provided as a Mobile IP key:

$$MM\text{-}HA\text{-}PMIP4=H(MIP\text{-}RK, \text{``}PMIP4MNHA\text{''}|HA\text{-}IP)$$

$$MN\text{-}HA\text{-}CMIP4=H(MIP\text{-}RK, \text{``}CMIP4MNHA\text{''}|HA\text{-}IP)$$

$$MM\text{-}HA\text{-}PMIP6=H(MIP\text{-}RK, \text{``}PMIP6MNHA\text{''}|HA\text{-}IP)$$

$$MN\text{-}HA\text{-}CMIP6=H(MIP\text{-}RK, \text{``}CMIP6MNHA\text{''}|HA\text{-}IP)$$

The character string used during the calculation of the hash value using the hash function H can be composed for example of concatenated character substrings, a character substring HA-IP preferably being formed by the IP address of the home agent 4B. Said character substring is appended or, as the case may be, concatenated to a character string which is different for the cases PMIPv4, CMIPv4, PMIPv6 and CMIPv6, and is, for example, "PMIP4MNHA" for the PMIPv4 case, "CMIP4MNHA" for the CMIPv4 case, "PMIP6MNHA" for the PMIPv6 case, and "CMIP6MNHA" for the CMIPv6 case. The hash function H is then used to calculate the hash value from the composed character string and a Mobile IP root key (MIP-RK). Since the composed character string has a part that is different for the cases PMIPv4, CMIPv4, PMIPv6 and CMIPv6, the four calculated hash values $H_{P4}$ (MM-HA-PMIP4), $H_{C4}$ (MN-HA-CMIP4), $H_{P6}$ (MM-HA-PMIP6), $H_{C6}$ (MN-HA-CMIP6) are different for the cases PMIPv4, CMIPv4, PMIPv6 and CMIPv6 and can be provided as the Mobile IP key for the respective case.

In one variant, only the two PMIP keys (MN-HA-PMIP4, MN-HA-PMIP6), but no CMIP key (MN-HA-CMIP4, MN-HA-CMIP6), are sent to the access serving network 5.

If, in a further variant, a distinction is also drawn between Mobile IP version 4 and Mobile IP version 6 by a transmitted parameter P, the authentication server will only provide either the Mobile IP key for version 4 (MM-HA-PMIP4 or MN-HA-CMIP4) if the parameter P specifies that Mobile IP version 4 is being used, or will only provide the Mobile IP key for version 6 (MM-HA-PMIP6 or MN-HA-CMIP6) if the parameter P specifies that Mobile IP version 6 is being used.

In one variant the parameter P transmitted during the authentication specifies whether Mobile IP version 4 or Mobile IP version 6 is being used. The authentication server transmits only the corresponding PMIP key (MN-HA-PMIP4 or MN-HA-PMIP6) to the access serving network 5, i.e. MN-HA-PMIP4 is sent to the access serving network 5 if the use of Mobile IP version 4 is encoded by the parameter P, and MN-HA-PMIP6 is sent to the access serving network 5 if the use of Mobile IP version 6 is encoded by the parameter P.

Figure 9:
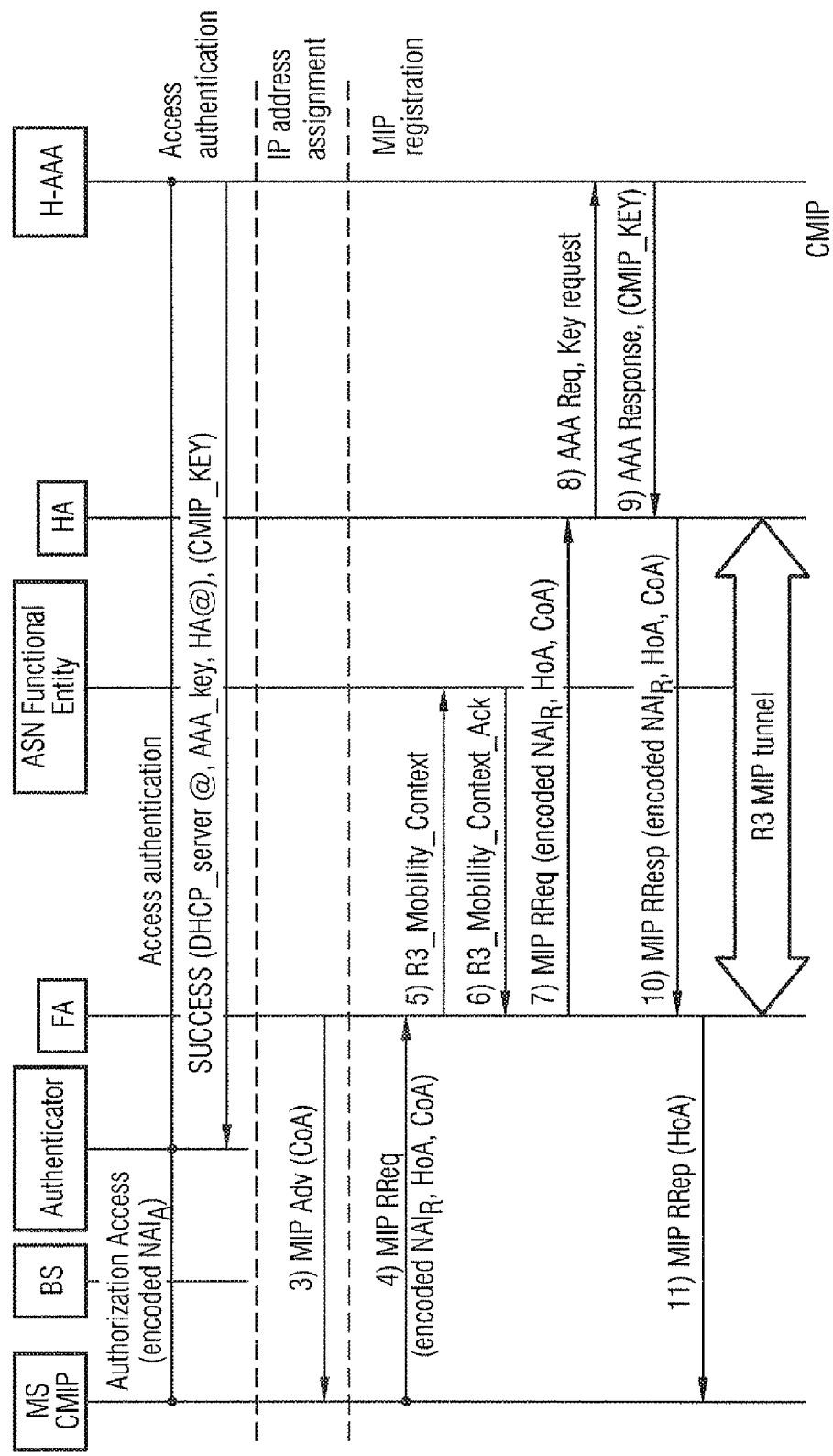
FIG. 9 shows a signal diagram for a CMIP case for the purpose of explaining the proposed method for providing a Mobile IP key.

FIG. 9 serves to illustrate the proposed method. In the signal diagram shown in FIG. 9 a CMIP case is considered in which the mobile terminal 1 itself supports Mobile IP. In the CMIP case the authentication server 4A either transmits no Mobile IP key to the authenticator 5A within the access serving network 5 (i.e. no Mobile IP key MIP-KEY is contained in the SUCCESS message), or a PMIP key different from the PMIP case is transmitted to the authenticator 5A, as shown in FIG. 9.

Figure 10:
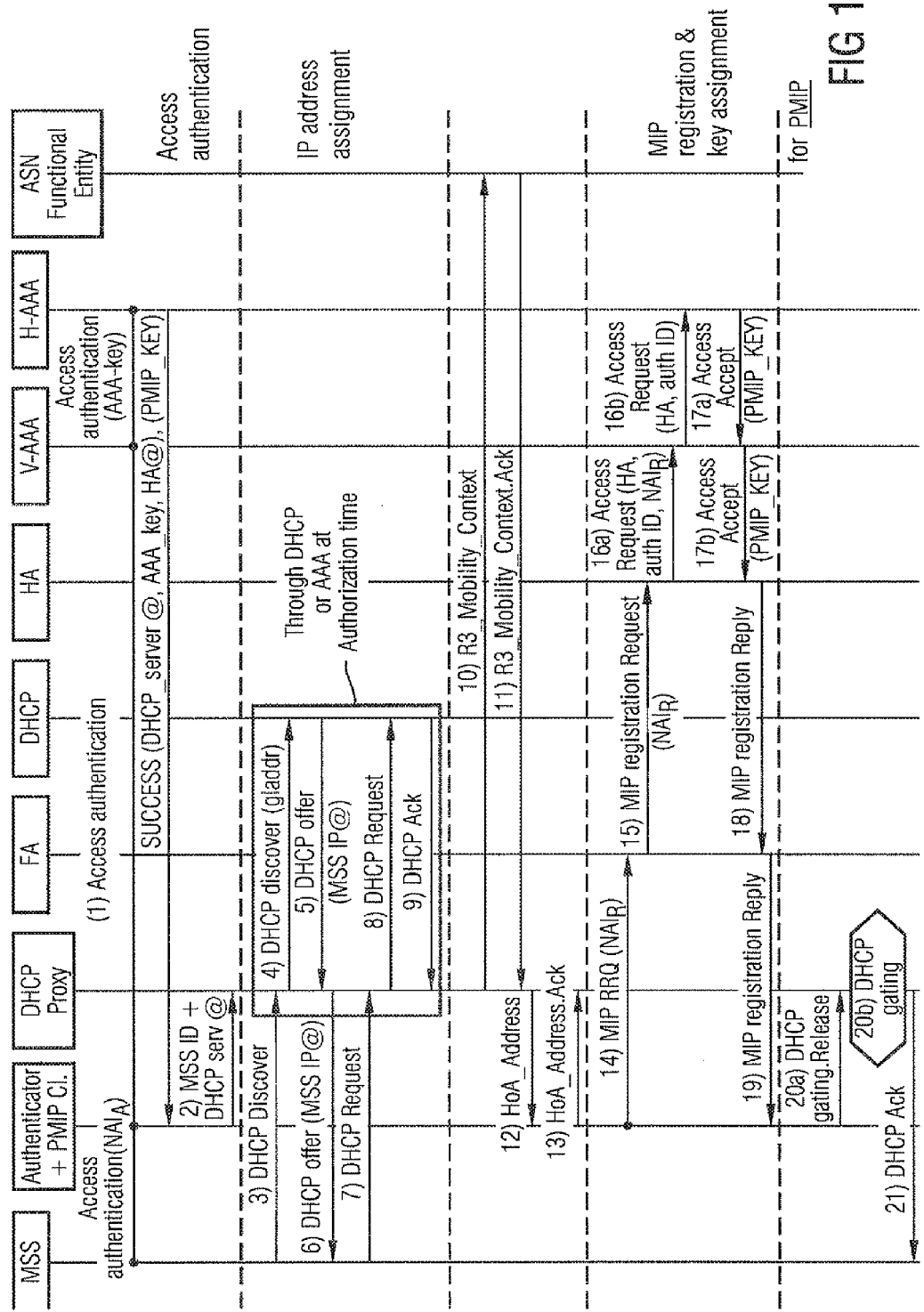
FIG. 10 shows a further signal diagram for a PMIP case for the purpose of explaining the proposed method for providing a Mobile IP key.

FIG. 10 shows a signal diagram for the PMIP case under the proposed method. For the PMIP case, in which the mobile terminal 1 itself does not support Mobile IP, a Mobile IP key is provided by the authentication server 4A to the PMIP client 5C and the authenticator 5A within the gateway node 5 of the access serving network 5, said Mobile IP key being transmitted in a SUCCESS message. Said Mobile IP key is either a PMIP key (PMIP-Key) specially calculated for this case or the conventionally derived Mobile IP key, which is then provided to the PMIP client only for the PMIP case, i.e. in the CMIP case the key would not be provided to the authenticator and hence to the PMIP client.

In the proposed method, the authentication server 4A recognizes on the basis of a parameter whether the subscriber terminal 1 itself supports Mobile IP (CMIP case) or itself does not support Mobile IP (PMIP case). Said parameter P is preferably derived from a parameter P transmitted for the purpose of access authentication by the EAP protocol.

The parameter P does not necessarily have to be encoded during the network login. The encoding can also be performed with the aid of a parameter P that is transmitted to the authentication server 4A in a message during a registration of the subscriber terminal 1. In particular when the encoding is performed only in the case of MIP signaling messages, but not during the network login, the security parameter index SPI contained in a Mobile IP signaling message is used for that purpose in one embodiment of the method.

FIG. 11 shows a signal diagram to illustrate said embodiment. The gateway node 5 sends a registration request containing a correspondingly encoded security parameter index SPI, on the basis of which the authentication server 4A can establish whether the mobile terminal 1 uses Mobile IP (CMIP case) or not (PMIP case). The security parameter index SPI is a 32-bit numeric value. The security parameter index SPI is defined in RFC3344 for MIPV4 "IP Novelty Support for IP V4" and in RFC4285 "Authentication Protocol for Mobile IP V6" for MIPV6.

For example, in one embodiment one permanently predefined SPI value can encode the PMIP case, and a second predefined SPI value can encode the CMIP case.

Alternatively, a specific bit of the security parameter index SPI can be defined for this purpose, for example the most significant bit or the least significant bit 0. For example, an SPI value in which said bit has a value 0 encodes the CMIP case, while if said bit has the value 1, the PMIP case is indicated.

In the diagram shown in FIG. 11, for example, the SPI value is odd, i.e. the last bit is set to 1, which means that the PMIP case is indicated.

If in addition a distinction is also to be drawn between Mobile IP version 4 and Mobile IP version 6, this can be encoded accordingly by SPI values: For example, in one embodiment four values can be predefined for the cases CMIPv4, PMIPv4, CMIPv6 and PMIPv6.

Alternatively two specific bits of the security parameter index SPI can be defined for this purpose, for example the two most significant bits or the two least significant bits. For example, an SPI value in which said bits have a value 00 encodes the CMIPv4 case, a value of 01 the PMIPv4 case, a value of 10 the CMIPv6 case, and a value of 11 the PMIPv6 case.

In the example shown in FIG. 12 the registration request transmitted by the mobile terminal 1 contains an even SPI value which indicates that the terminal 1 uses Mobile IP. Said SPI value is further transmitted to the authentication server 4A, which recognizes on the basis of the SPI value that the PMIP case is present and transmits a corresponding CMIP key to the home agent 4B.

With the proposed method, any parameter P transmitted to the authentication server 4A during the access authentication or the MIP registration can in principle be used for encoding the CMIP or PMIP case.

The proposed method is suitable in particular for WiMax networks. WiMax already uses certain parameters to signal a specific authentication mode. In particular use is already made in WiMax of a subscriber identity NAI which according to the proposal is encoded in one embodiment in order to indicate the PMIP or CMIP case, as appropriate. This enables a very simple implementation, because the subscriber identity NAI is evaluated in any case. This reduces the signaling overhead for distributing Mobile IP keys as well as the storage space requirement for storing Mobile IP keys, since only the keys actually required are distributed.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for providing a Mobile IP (MIP) key for encrypting messages between a subscriber terminal or a Proxy Mobile Internet Protocol (PMIP) client and a home agent, comprising:
    reviewing an encoded parameter at an authentication server;
    determining, on the basis of the encoded parameter at the authentication server, whether the subscriber terminal itself supports Mobile IP under terminal-based mobility management or client MIP (CMIP) or whether the subscriber terminal itself does not support Mobile IP under network-based mobility management or PMIP; and
    providing the Mobile IP key from the authentication server only when the subscriber terminal itself does not support Mobile IP under PMIP, wherein
    the subscriber terminal is a mobile terminal,
    the authentication server has two different MIP keys,
    the home agent is provided with a client MIP key by the authentication server when the subscriber terminal itself supports Mobile IP, and
    the home agent is provided with a proxy MIP key by the authentication server when the subscriber terminal itself does not support Mobile IP.

2. The method as claimed in claim 1,
    wherein the encoded parameter is an encoded subscriber identity.

3. The method as claimed in claim 1, wherein the authentication server is an authentication, authorization and accounting (AAA) authentication server.

4. The method as claimed in claim 2, wherein
    the encoded subscriber identity is transmitted to the authentication server in a message during an authentication of the subscriber terminal.

5. The method as claimed in claim 2,
    wherein the encoded subscriber identity is transmitted to the authentication server in a message during a registration of the subscriber terminal.

6. The method as claimed in claim 1,
    wherein the encoded parameter is an encoded security parameter index.

7. The method as claimed in claim 6,
    wherein the encoded security parameter index is transmitted to the authentication server during a registration of the subscriber terminal.

8. The method as claimed in claim 1, wherein
    the subscriber terminal is a mobile terminal, and
    the parameter is encoded by the mobile terminal.

9. The method as claimed in claim 1, wherein the parameter is encoded by an authenticator.

10. The method as claimed in claim 1,
    wherein the parameter is encoded by the PMIP client.

11. The method as claimed in claim 1,
    wherein the parameter is encoded by a foreign agent.

12. The method as claimed in claim 1,
    wherein information indicating which MIP version is present is additionally encoded in the parameter.

13. The method as claimed in claim 1,
    wherein the home agent requests the Mobile IP key from the authentication server, specifying the encoded parameter in the process.

14. The method as claimed in claim 1,
wherein the authentication server uses a hash function H to calculate a hash value based on a Mobile IP root key and a character string, said hash value being provided as the Mobile IP key.

15. The method as claimed in claim 14,
wherein the character string is formed of concatenated character substrings.

16. The method as claimed in claim 15,
wherein one character substring is formed from an IP address of the home agent.

17. The method as claimed in claim 2,
wherein the subscriber identity has the following data format:
(Routing Realm1! Routing Realm2! ... !) {Auth Mode} pseudo Identity @realm,
where the pseudo Identity is a random number generated by the terminal during authentication and
where Auth Mode is a character which specifies an authentication mode.

18. The method as claimed in claim 17,
wherein the encoded subscriber identity extends the authentication mode by at least one character which specifies whether the subscriber terminal uses Mobile IP.

19. A system for providing a Mobile IP (MIP) key for encrypting messages between a subscriber terminal or a Proxy Mobile Internet Protocol (PMIP) client and a home agent, comprising:
an authentication server to review an encoded parameter, to determine from the encoded parameter whether the subscriber terminal itself supports Mobile IP under terminal-based mobility management or client MIP (CMIP) or whether the subscriber terminal itself does not support Mobile IP under network-based mobility management or PMIP, and to provide the Mobile IP key only when the subscriber terminal does not support Mobile IP under PMIP, wherein
the subscriber terminal is a mobile terminal, the authentication server has two different MIP keys, the home agent is provided with a client MIP key by the authentication server when the subscriber terminal itself supports Mobile IP, and the home agent is provided with a proxy MIP key by the authentication server when the subscriber terminal itself does not support Mobile.

20. The system as claimed in claim 19,
wherein the encoded parameter is an encoded subscriber identity.

21. The system as claimed in claim 19,
wherein the encoded parameter is an encoded security parameter index.

22. A mobile terminal comprising:
a transmitter to transmit an encoded parameter in a network login message that is addressed to an authentication server, and/or in a MIP registration request message that is addressed to a home agent, said encoded parameter specifying whether the mobile terminal itself supports Mobile IP under terminal-based mobility management or client MIP (CMIP) or whether the subscriber terminal itself does not support Mobile IP under network-based mobility management or PMIP, wherein
the authentication server has two different MIP keys, the home agent is provided with a client MIP key by the authentication server when the mobile terminal itself supports Mobile IP, and the home agent is provided with a proxy MIP key by the authentication server when the mobile terminal itself does not support Mobile.

* * * * *

UNITED STATES PATENT AND TRADEMARK OFFICE
CERTIFICATE OF CORRECTION

PATENT NO.         : 8,611,543 B2                                        Page 1 of 1
APPLICATION NO.    : 12/303092
DATED              : December 17, 2013
INVENTOR(S)        : Falk et al.

It is certified that error appears in the above-identified patent and that said Letters Patent is hereby corrected as shown below:

In the Claims:

In Column 16, Line 11, In Claim 19, delete "support Mobile." and insert -- support Mobile IP. --, therefor.

In Column 16, Line 33, In Claim 22, delete "support Mobile." and insert -- support Mobile IP. --, therefor.

Signed and Sealed this
First Day of April, 2014

Michelle K. Lee
*Deputy Director of the United States Patent and Trademark Office*